Patented Sept. 18, 1928.

1,684,712

UNITED STATES PATENT OFFICE.

MAX PAUL NITSCHE, OF DRESDEN, GERMANY.

PROCESS FOR THE PRODUCTION OF FERTILIZERS.

No Drawing. Application filed September 25, 1926, Serial No. 137,816, and in Germany October 8, 1925.

A large number of experiments for producing fertilizers from the waste liquors obtained in sulphite cellulose factories, are known and dealt with in patent and other literature.

However not one single process is in use at present which satisfies the requirements which are demanded of a fertilizer made from this waste material. The reason which always prevented the adoption or use as fertilizer was the considerable amount of fixed and free sulphurous acid in the waste liquors.

An attempt was made to combine the sulphurous acid with lime or other bases and thus make it innocuous. In practice however it was found that the less strong carbonic acid also liberates the sulphurous acid from the sulphites and thus injuries or destroys the plant growth. It was also found that the fixed sulphurous acid in the waste liquors cannot be liberated from the compounds it forms with bases, but in the course of time splits off of itself from these compounds and then acts just as detrimentally upon the living vegetable organisms.

It is known in analytical chemistry that the whole of the sulphurous acid can be expelled from the waste liquors by phosphoric acid. Other strong non-volatile acids have the same effect, with the exception of sulphuric acid.

In the evaporation of the waste liquors, this latter acid exerts a strong oxidizing action and burns the organic substances, while being itself reduced to sulphurous acid.

It has been found that a salt which has not hitherto been employed,—the acid salt of sulphuric acid, viz. a bisulphate,—is very suitable for completely expelling the sulphurous acid from the waste liquors, without the organic substances contained in the same being destroyed.

In order to increase the fertilizing value of the fertilizer obtained in this manner use is preferably made of potassium bisulphate. The sulphurous acid in the waste liquors is determined beforehand and then when evaporating the amount of potassium bisulphate equivalent thereto is added.

Preferably evaporation is carried out by means of a vacuum apparatus.

The advantage of this process is twofold. In the first place the whole of the sulphurous acid is recovered and can be returned to the process again and moreover a very good fertilizer for the soil is obtained. The bacteria of the soil which combine with nitrogen, vigorously absorb as a nutrient, the carbohydrates etc. contained therein and owing to their vitality combine with large quantities of nitrogen from the air. The soil treated with this fertilizer does not therefore require to be fertilized with nitrogen, more especially as the enriching of the soil with nitrogen is perceptible for some length of time. If necessary this fertilizer can be mixed beforehand with bacteria cultures which are capable of combining with nitrogen, in order to inoculate soils poor in bacteria simultaneously when applying the fertilizer.

The other salts contained in this fertilizer, for instance the potassium and calcium salts etc. as well as the phosphoric acid of plant origin, increase very considerably the fertilizing value of the fertilizer produced by this process.

The residues obtained in this manner in the evaporation by means of a vacuum apparatus have neutral to acid properties. Surplus acid is preferably rendered innocuous by means of lime or Thomas meal.

*Example.*

To a sulphite cellulose waste liquor, containing 5,84 kg. fixed and 2,56 kg. free sulphurous acid, that is to say in all 8,40 kg. sulphurous acid, expressed in cbm., 35,71 kg. potassium bisulphate are added per cbm. and evaporated in a vacuum.

Since practically 100 kg. solid residues are left from one cbm. waste liquor, 127,2 kg. of fertilizer are formed with the potassium bisulphate and 8,4 kg. sulphurous acid. The latter is returned to the process. The sulphurous acid removed in the evaporation can be collected and used for the preparation of fresh quantities of sulphite cellulose.

What I claim is:—

1. A method of producing a fertilizer from sulphite waste lye which is obtained in the manufacture of sulphite cellulose, consisting in adding an acid salt of sulphuric acid to the lye and subjecting the resulting liquor to evaporation, whereby the sulphurous acid is removed and a residue is obtained which constitutes the fertilizer.

2. A method of producing a fertilizer from sulphite waste lye which is obtained in the manufacture of sulphite cellulose, consisting in adding potassium bisulphate to the lye and subjecting the resulting liquor to evaporation, whereby the bisulphate is removed and a residue is obtained which constitutes the fertilizer.

In testimony whereof I have signed my name to this specification.

MAX PAUL NITSCHE.